Aug. 6, 1929.                A. O. AUSTIN                1,723,000
             MEANS FOR DIVERTING ENERGY FROM CONDUCTORS
                   Filed March 31, 1928      3 Sheets-Sheet 1

INVENTOR
Arthur O Austin.
BY
ATTORNEY

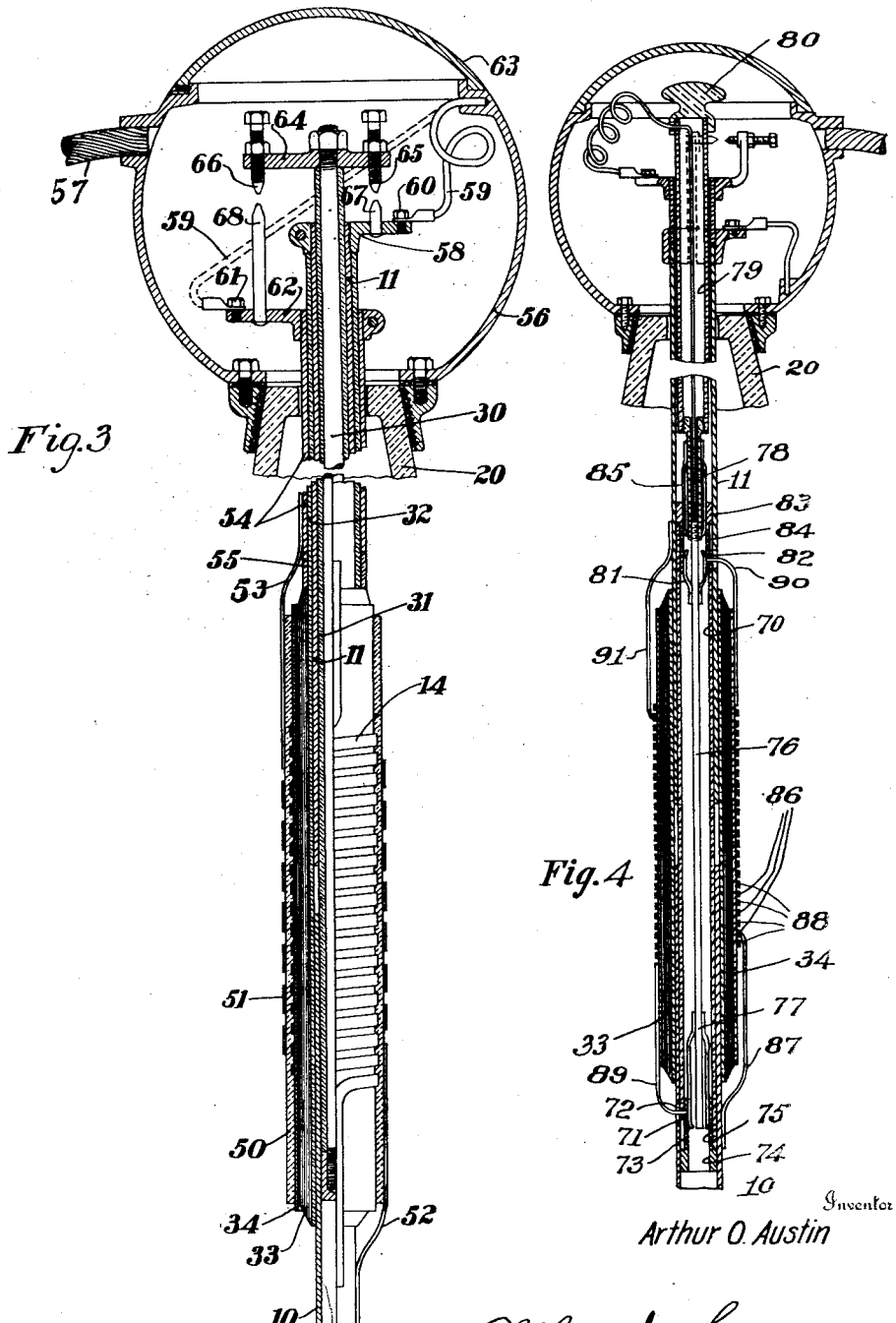

Patented Aug. 6, 1929.

1,723,000

UNITED STATES PATENT OFFICE.

ARTHUR O. AUSTIN, OF NEAR BARBERTON, OHIO, ASSIGNOR, BY MESNE ASSIGNMENTS, TO THE OHIO BRASS COMPANY, OF MANSFIELD, OHIO, A CORPORATION OF NEW JERSEY.

MEANS FOR DIVERTING ENERGY FROM CONDUCTORS.

Application filed March 31, 1928. Serial No. 266,276.

This invention relates to a construction which may be used in connection with a bushing insulator for diverting a relatively small amount of energy from a high potential conductor which passes through the insulator, for the purpose of metering, relay operation, synchronizing, or other operations where it is not desired to employ an expensive potential transformer and where a comparatively small amount of energy is required.

One object of the invention is to provide an arrangement of the class named which shall be economical to manufacture, efficient in operation, convenient to install and which will not impair the insulation of the device with which it is used. Other objects and advantages will appear from the following description.

The invention is exemplified in the combination and arrangement of parts shown in the accompanying drawings and described in the following specification and it is more particularly pointed out in the appended claims.

In the drawings:

Fig. 3 is a somewhat diagrammatic, vertical sectional view of another modification of the invention.

Fig. 4 is a view similar to Fig. 3 showing another modification of the invention.

In high voltage installations, it is frequently necessary to provide current transformers which will indicate the current flowing in the high voltage conductor. This current may be required for metering purposes, for the operation of relays or circuit breakers or for other purposes. At moderately high voltages, it has been customary to use the high voltage bushing on a circuit breaker at the entrance to the station or on a transformer for the insulation between the primary and secondary circuit of the current transformer. The lead running through the bushing forms the primary or high voltage winding and the secondary winding is wound on an iron core placed in a plane normal to the axis of the bushing. This arrangement operates satisfactorily when the outside diameter of the bushing is small or the current in the primary lead very large. Where the current in the lead through the bushing is relatively small, or the diameter of the bushing very large, because of high voltage, the regulation of the current transformer is likely to be very poor and the volt ampere output is likely to be too small for satisfactory operation of relays or for metering.

Where the diameter of the bushing is large and even where the current is fairly large through the bushing, the iron core of the transformer surrounding the bushing is necessarily large to provide low reluctance of the magnetic circuit. An iron core of this nature on the outside of the bushing cuts down the insulation of the bushing or requires an increase in the length of the bushing. The present invention overcomes these disadvantages and has other advantages, particularly where the voltages are high.

With the present invention it is not necessary to provide a large pocket on the outside of the bushing for the current transformer.

Other advantages of the invention are that good regulation may be obtained, the insulation of the outside of the transformer is not impaired, and a bushing having a large diameter for high dielectric strength may be used without seriously affecting the regulation of the current transformer.

Figure 1:
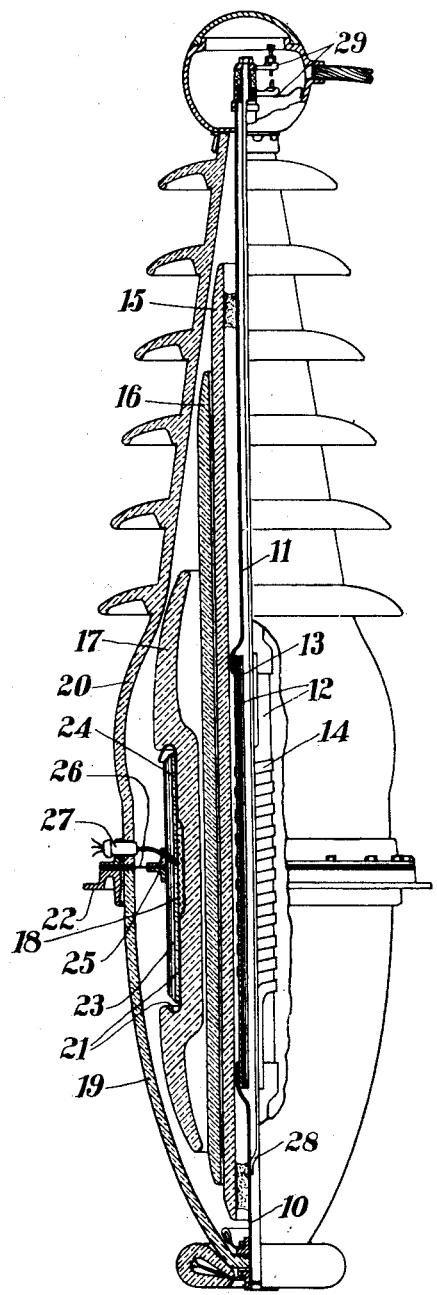
Fig. 1 is an elevation with parts in section showing one embodiment of the present invention.

Referring to Fig. 1, the numeral 10 designates the lower section and the numeral 11 the upper section of a tubular conductor, the two sections being joined by a dielectric tube 12 to the ends of which the sections 10 and 11 are attached. A laminated soft iron core 13 is disposed within the tube 12 and the ends of the sections 10 and 11 are preferably swaged or shrunk onto the fiber sleeve 12 and iron core 13 so that together the parts 10, 11, 12 and 13 form a rigid mechanical member.

A helical winding 14 is placed over the iron core 13 and insulating sleeve 12 and the ends of the winding are connected respectively to the conductor sections 10 and 11 so that current in passing from one section to the other of the conductor cannot flow in a straight line but must flow around and magnetize the core 13. This increases the magnetic flux in the iron core so that, although the current may be weak, the core will be sufficiently magnetized because of the plurality of turns it provides.

The tubular members 10 and 11 may be used for supporting insulating baffles 15 and 16. An outer baffle 17 is surrounded by a winding 18 which forms the secondary winding of the current transformer. This secondary winding may have any suitable number of turns and may be placed as near the center of the bushing as insulating requirements will permit. In large oil-filled bushings, the outer dielectric housing members 19 and 20 may readily be placed at a somewhat greater distance from the axis of the bushings than the winding 18. This greater diameter tends to cut down the intensity of the field outside of the bushing and thereby improves the length efficiency of the bushing and does not interfere with the efficiency of the current transformer as is the case where the secondary of the current transformer must be slipped over the outside of the bushing. One end of the winding 18 may be grounded to the flange of the bushing so as to provide charging current or, if desired, a metalized or charging surface 21 may be provided between the winding 18 and the insulating baffle 15. This charging screen will relieve the winding 18 of any electrostatic stress so that it will not be necessary to ground the winding unless desired. The metalized surface or charging screen 21 should not form a short circuit turn encircling the sleeve since a short circuit turn in this position would interfere with the operation of the winding 18.

It is evident that some of the magnetic flux set up by the helix 14 may not return in a path to include all of the turns of the winding 18 but this will not materially impair the operation of the arrangement so long as the flux cutting the winding 18 is proportional to the current flowing in the lead 10 for the range of operation of the installation. The path of the flux may be controlled, to some extent, by baffles composed of magnetic material or of material having exceedingly low resistance, such as copper.

By keeping the metal parts, such as the flange 22 of the bushing or the housing on which the bushing is mounted, at a considerable distance from the axis of the bushing, a large portion of the magnetic flux will return without cutting the short circuit turn formed by these metal parts. In order to assist in controlling the path of the magnetic flux, the baffle 17 may be wrapped with thin layers of iron as shown at 23, the several layers being insulated from each other so that a short circuit is not formed. This wrapping is placed outside of the winding 18 and is separated therefrom by an insulating sleeve 24. The wrapping projects well along the axis of the bushing and will form a return path outside of the winding 18 for a considerable portion of the magnetic flux eminating from the core 13. The magnetic wrapping 23 may be clamped or held by a ring 25 which, in turn, is supported at the middle of the bushing by a plate 26 secured to the flange 22. The ring 25 and wrapping 23 support the outer baffle 17 and inner baffles may also be supported in this way, if desired, by securing them to the baffle 17.

The leads and taps for the secondary winding 18 are brought out through a bushing 27 extending through the side of the housing member 20 and are insulated from each other and form an oil tight joint with the housing.

A jumper 28 is connected to the lower section 10 of the central conductor and extends upwardly through the core 13 and upper section 11 of the tubular conductor and is connected at its upper end to one terminal of a spark gap 29. The other terminal of the spark gap is connected to the tubular conductor 11 and the two terminals are insulated from each other and provided with adjustable discharge points as shown in the drawing. This provides a gap for limiting the voltage across the winding 14 which will break down and relieve the insulation between the two ends of the sections 10 and 11 if abnormal stress is produced by transient disturbances or surges. By properly proportioning the various parts, it is possible to produce a current transformer of increased efficiency and still maintain the insulating properties of the bushing. The construction requires but a small amount of magnetic material and is easily built into a high voltage bushing. A regulation in the transformer is secured which is not possible except at prohibitive cost where the current transformer is made by windings over a magnetic core placed on the outside of the bushing. The magnetic winding 23 may be utilized as an electrostatic screen or shield such as is used in most bushings of large size to prevent charging current flowing over the outside surface. It will perform this function in addition to that of a magnetic path without affecting its function in the latter role.

The improvement shown is for large oil-filled bushings but the invention is equally applicable to many other types and to the construction of current transformers even where bushings are not otherwise required.

Figure 2:
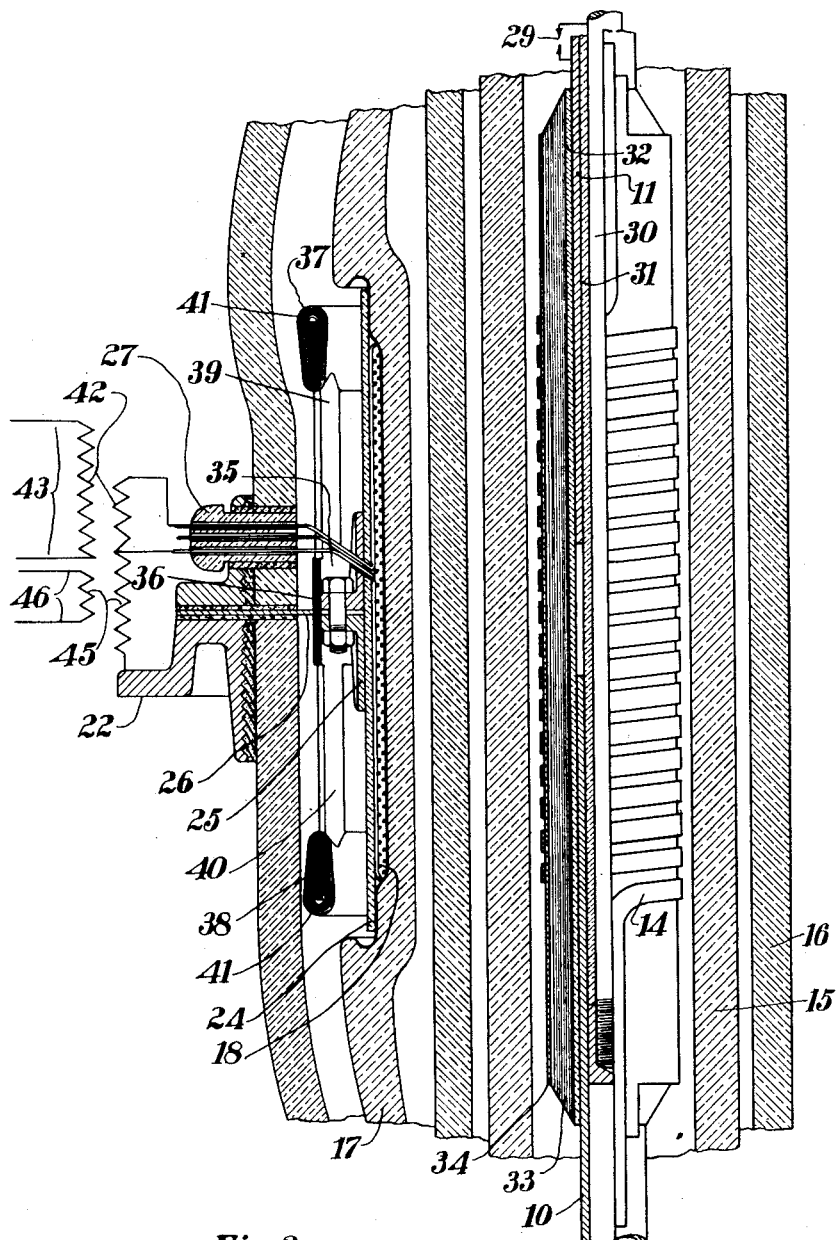
Fig. 2 is a fragmentary section on a somewhat larger scale showing a slightly different form of the invention.

In the modified form of the invention, shown in Fig. 2, a rod 30 is connected to the lower section 10 of the conductor and extends upwardly to the limiting gap 29 between the rod and upper section 11 of the conductor. The rod 30 is insulated from the section 11 by a dielectric sleeve 31. A second dielectric sleeve 32 surrounds the conductor sections 10 and 11 and a laminated iron wrapping 33 is disposed about the sleeve 32. An additional insulating sleeve 34 surrounds the iron core 33 and the helical winding 14 is wrapped upon the sleeve 34. The winding 14 connects the upper and lower sections 10 and 11 of the central conductor the same as in the form already described. The secondary winding 18 and dielectric sleeve 24 are disposed on the outer surface of the outer baffle 17 in a manner similar to that shown in Fig. 1 except that the winding 18 is shown as extending along the bushings a somewhat greater distance than in the form previously described. The baffle 17 is supported by clamping rings 25 which engage the plate 26 the same as in the form shown in Fig. 1. In this case however, the rings 25 engage directly the insulating sleeve 24 and a path for the returning magnetic flux is provided by a laminated sheet iron member 35. The member 35 is provided with a central ring portion 36 and top and bottom rings 37 and 38. The top and bottom rings are connected to the central ring by vertical bars 39 and 40. The rings 36, 37 and 38 may be divided transversely so as not to form closed circumferential turns. The rings 37 and 38 are wound with insulating material 41 such as varnished cambric. This forms an insulated electrostatic flux control member which prevents charging current from flowing over the surface of the bushing and tends to raise the flash-over voltage of the bushing in the manner described in my prior Patent Number 1,699,342, granted January 15, 1929. The form of the flux control member, having relatively narrow supporting arms which support the circumferential rings at their extremities, makes it possible to wind the rings readily with the insulating tape or cambric.

The central ring 36 is provided with perforations or slots through which teeth on the inner edge of the plate 26 project so as to be clamped between the upper and lower portions of the clamping ring 25. The ends of the winding 18 may be carried out through the bushing 27 and connected with the primary of a transformer 42 or directly to a relay or other electrically operated device. The secondary winding of the transformer 42 is connected by leads 43 to a meter, relay, synchronizing device or other apparatus to which current is to be supplied. It is apparent that any number of taps from the winding 18 may be carried out through the bushing 27 to give various voltages desired. A single connection with the winding 18 may be connected through the primary of a transformer 45 or other electrically energized device to the supporting flange 22 or other grounded structure. The secondary winding of the transformer 45 may be connected through leads 46 to any apparatus to which it is desired to furnish current. The winding 18 forms, with the conductor 10 and the interposed baffles, the elements of a condenser, charging current for which will flow through the transformer 45. The amount of this current will, of course, depend upon the capacity of the condenser thus formed, the voltage and frequency of the impressed voltage and the resistance in the circuit. The operation of an arrangement of this nature is more completely described and claimed in my prior application, Serial Number 248,472, filed January 21, 1928, but the present construction differs from that of my prior application in that the current transformer winding 18 is utilized as one element of the condenser without interfering with its function as the secondary winding of a current transformer.

Various arrangements may be made for adjusting the number of turns of the primary winding in order to regulate the voltage induced in the secondary winding of the current transformer. One arrangement for securing this result is illustrated in Fig. 3. In this Figure the conductors 10 and 11, the iron core 33 and the winding 14 are arranged in the manner illustrated in Fig. 2. Outside of the winding 14, however, there is placed an additional insulating sleeve 50 and a winding 51 of relatively few turns is laid upon the outer surface of the sleeve 50. The lower end of the winding 51 is connected by a jumper 52 to the conductor 10 and the upper end of the winding is connected by a jumper 53 to a conductor tube 54 placed outside of the insulating tube 32.

A spacer 55 separates the conductor tube 54 from the end of the magnetic core 33. A terminal housing 56, similar to that shown in Fig. 1, is mounted on the upper end of the bushing 20 and is provided with a conductor lead 57 which carries the main current away from the bushing. The upper end of the conductor tube 11 is provided with a terminal collar 58 connected by a jumper 59 to the housing 56. The jumper 59 is detachably secured to the collar 58 by a binding post 60. While the housing 56 is connected in this way to the collar 58, the current will flow through the winding 14, conductor tube 11 and jumper 59 to the housing 56 and thence to the lead 57. With this connection the operation is like that of Fig. 2. If a fewer number of turns in the primary winding is desired, the jumper 59 is connected by a binding post 61 to a collar 62 secured to the upper end of the tube 54. This will disconnect the winding 14 and place the winding 51 in the main circuit. The housing 56 is provided with a removable cover 63 which permits access to the interior of the housing for making desired adjustments.

The central rod 30 is provided with a head 64 having discharge points 65 and 66 which cooperate with points 67 and 68 on the terminal heads 58 and 62 respectively to provide arcing gaps for limiting the voltage applied to the windings 14 and 51.

In the arrangement shown in Fig. 4, an insulating tube 70 is disposed within the conductor tubes 10 and 11 and bridges the space between the tubes. A contact ring 71 is arranged within the lower end of the tube 70 and provided with a lug 72 which extends through a slot 73 in the tube 70. A contact ring 74 is spaced downwardly from the contact ring 71 by a spacing collar 75. The contact ring 74 extends below the end of the tube 70 and engages the conductor tube 10. A rod 76 of conducting material is provided with contact wipers 77 for engaging the contact rings 71 and 74. In the position shown in the drawing, the wipers 77 are in contact with the ring 71 only, but the rod 76 may be moved downwardly to cause the wipers to engage both rings 71 and 74. The upper end of the rod 70 is connected by an insulating tube 78 to a larger tube of insulating material 79 which carries a knob 80 at its upper end. The upper end of the tube 76 is provided with contact wipers 81 arranged to engage the contact ring 82 disposed within the tube 70. A second contact ring 83 is mounted in the upper end of the tube 70 and is spaced from the contact rings 82 by a spacing collar 84. Contact wipers 85 are mounted on the insulating tube 78 in position to bridge the space between the contact sleeves 82 and 83 when the knob 80 is depressed.

Two sets of windings are arranged on the outer face of the dielectric sleeve 34 which surrounds the magnetic core 33. These windings may be coextensive and the turns of the separate windings will alternate with one another. One of these windings designated by the numeral 86, is connected by a jumper 87 to the tube 10 and the other winding, designated by the numeral 88, is connected by a jumper 89 to the contact sleeve 71.

The upper end of the winding 86 is connected by a jumper 90 to the contact sleeve 82 and the upper end of the winding 88 is connected by a jumper 91 to the tube 11. When the knob 80 is raised, as shown in Fig. 4, and the contact wipers are in the position shown in that figure, current entering through the tube 11 will follow the jumper 91 and winding 88 to the jumper 89 and thence to the contact sleeve 71. From the sleeve 71 the current will continue through the wipers 77, rod 76, wipers 81, contact sleeve 82 and jumper 90 to the windings 86 and from the windings 86 through the jumper 87 to the conductor tube 10. With this arrangement the current will flow through both windings in series and in the same direction so that all of the turns will be effective in establishing the magnetic field.

By pushing the knob 80 downwardly, the wipers 85 will connect the contact sleeves 82 and 83 so that the upper ends of both coils will be connected through the jumpers 90 and 91 respectively, with the tube 11. In a like manner the wipers 77 will connect the contact sleeves 71 and 74 so that the lower ends of both coils 86 and 88 will be connected to the tube 10. In this way the two coils are placed in parallel so that the current will be divided between the two coils and the number of ampere turns decreased.

It will be readily apparent to those skilled in the art that many other arrangements may be provided for adjusting the number of effective turns in the primary winding and the adjustments illustrated in Figs. 3 and 4 are merely shown and described by way of example, it being understood that the invention is not limited to the particular mechanism for adjusting the primary winding except as defined in the appended claims.

I claim:

1. The combination with a conductor having a break therein, of a jumper connecting the portions of the conductor at opposite sides of said break, said jumper being formed into a coil having its axis extending in the direction of said conductor to form the primary of a current transformer and a secondary winding for said current transformer disposed so that the magnetic field of said primary interlinks with said secondary winding.

2. The combination with a high voltage conductor having a break therein, of a jumper bridging said break and comprising a coil having its axis extending in the direction of said conductor, a magnetic core for said coil, an insulating sleeve surrounding said coil and a secondary winding disposed outside of said insulating sleeve and cooperating with said coil and core to form a current transformer.

3. The combination with a bushing insulator of a conductor extending through said insulator and having a coil in series therewith disposed within said insulator, a secondary winding disposed within said insulator and forming with said coil a current transformer and a core for said transformer having an open magnetic circuit.

4. The combination with a bushing insulator of a conductor extending through said insulator and forming the primary of a current transformer and a secondary winding for said current transformer disposed within said bushing insulator, a core for said transformer having an air gap in the magnetic circuit thereof and an insulating member extending through said air gap.

5. The combination with a bushing insulator of a conductor extending through said insulator and having a series coil therein arranged with its axis extending in the direction of the axis of said insulator and forming the primary of a current transformer and a secondary winding for said transformer arranged with its axis extending in the direction of the axis of said insulator.

6. The combination with a bushing insulator of a conductor extending through said insulator and having a series coil arranged with its axis extending in the direction of the axis of said insulator and forming the primary of a current transformer, and a secondary winding for said transformer comprising a coil disposed within said bushing insulator and having its axis extending in the direction of the axis of said insulator.

7. The combination with a bushing insulator of a conductor extending through said insulator and having a break therein within said insulator, a helical winding connecting the portions of said conductor at opposite sides of said break and having its axis extending in the direction of the axis of said conductor, a magnetic core within said winding and a secondary winding surrounding said helical winding and forming a current transformer with said helical winding and core.

8. The combination with a bushing insulator of a conductor extending through said insulator and having a series winding comprising coils arranged with their axes extending in the direction of the axis of said insulator, an iron core disposed within said coils, a secondary winding surrounding said coils and insulated therefrom, a magnetic baffle for directing the magnetic field of said series winding in a return path outside of said secondary winding.

9. The combination with a bushing insulator of a conductor extending through said insulator and having a series turn within said insulator, forming the primary of a current transformer, a secondary winding for said transformer disposed within said insulator members of magnetic material for directing the magnetic field set up by said primary turn in a path interlinked with said secondary winding one of said members being disposed within said series turn and an insulating member surrounding said series turn and the member of magnetic material therein and interposed between said series turn and said secondary winding.

10. The combination with a bushing insulator of a conductor extending through said insulator, a coil for forming the secondary of a current transformer of which said conductor is the primary, said coil being insulated from said conductor and forming therewith the elements of a condenser, a lead connected with said coil for supplying charging current to said condenser, and an electrically operated device connected with said lead.

11. The combination with a conductor of a winding disposed adjacent said conductor and cooperating therewith to form both the secondary of a current transformer of which said conductor is the primary, and one element of a condenser of which said conductor is another element.

12. The combination with a bushing insulator of a conductor extending through said insulator, a winding disposed within said insulator and insulated from said conductor and cooperating with said conductor to form the secondary of a current transformer of which said conductor is the primary and one element of a condenser of which said conductor is another element, means for utilizing current from said transformer and means for utilizing current from said condenser.

13. The combination with a bushing insulator of a conductor extending through said insulator and having a series coil disposed within said insulator, a winding disposed within said insulator outside of said series coil, a dielectric sleeve interposed between said series coil and winding, a magnetic core arranged within said series coil, a magnetic flux return path disposed outside of said winding and within said bushing insulator and conductor leads connected with said winding.

14. The combination with a bushing insulator of a conductor extending through said insulator and having a series coil disposed within said insulator, a magnetic core arranged within said insulator, a secondary coil cooperating with said series winding to form a current transformer and a discharge gap in parallel with said series winding.

15. The combination with a bushing insulator of a conductor extending through said insulator and having a series coil therein, a magnetic core arranged within said coil, a secondary winding surrounding said coil, a dielectric baffle interposed between said coil and winding, a metallic support for said bushing insulator disposed outside thereof, and a member of magnetic material disposed within said bushing insulator and outside of said secondary winding for forming a return path for the magnetic field set up by said series coil outside of said secondary winding and inside of said metallic support.

16. The combination with a conductor of an insulator for said conductor, a secondary winding forming with said conductor a current transformer, and an electrostatic flux control member for said insulator, said control member being made of magnetic material to enable said control member to serve also as a device for directing the magnetic field of said current transformer.

17. The combination with a conductor of an insulator for said conductor, a secondary winding forming with said conductor a current transformer, an electrostatic flux control member for said insulator, said flux control member being formed of magnetic material to enable said flux control member to serve also as a return path for the magnetic flux of said current transformer and a covering of dielectric material for the extremity of said flux control member.

18. The combination with a member of conducting material of an electrostatic flux control connected with said member and comprising supporting arms extending away from said member and a transverse portion connected at the ends of said arms, said transverse portion being covered by a winding of dielectric material.

19. The combination with a bushing insulator of a metallic support for said insulator and an electrostatic flux control member disposed within said insulator and electrically connected with said metallic support, said flux control member comprising arm extending away from said support and provided with a ring at their extremities substantially co-axial with said bushing insulator, said ring being covered by a winding of flexible insulated material extended between said arms at the inner edge of said ring but completely covering the outer edge of said ring.

20. The combination with a high potential conductor, of a coil connected with said conductor for forming the primary of a current transformer, a bushing insulator through which said conductor passes and within which said coil is located a secondary winding for said current transformer, and means operable from without said insulator for adjusting the number of effective turns in said transformer primary.

21. The combination with a high potential conductor, of a bushing insulator for supporting said conductor, said conductor having a series coil connected therewith and disposed within said insulator and having its axis extending in the direction of the axis of said insulator and forming the primary of a current transformer, a secondary winding for said transformer, and means for adjusting the number of effective turns of said primary.

22. The combination with a high potential conductor, of a bushing insulator through which said conductor extends, a coil having a plurality of turns disposed in said insulator with their planes transverse to the axis of said insulator, said turns being arranged for connecting in series with said conductor, means for adjusting the number of effective turns of said coil, and a secondary winding forming, with said coil, a transformer for diverting energy from said conductor.

23. The combination with a bushing insulator, of a conductor extending through said insulator, a plurality of coils disposed within said insulator, a magnetic core for said coils, a secondary winding forming, with said coils, a current transformer, and means operable from without said insulator for connecting said coils in different combinations in circuit with said conductor.

In testimony whereof I have signed my name to this specification this 13th day of March, A. D. 1928.

ARTHUR O. AUSTIN.